United States Patent
Aikawa et al.

(10) Patent No.: US 7,440,673 B2
(45) Date of Patent: Oct. 21, 2008

(54) RADIATION RESISTANT SINGLE-MODE OPTICAL FIBER AND METHOD OF MANUFACTURING THEREOF

(75) Inventors: Kazuhiko Aikawa, Sakura (JP); Katsuaki Izoe, Sakura (JP); Naoki Shamoto, Sakura (JP); Manabu Kudoh, Sakura (JP); Takashi Tsumanuma, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/734,695

(22) Filed: Apr. 12, 2007

(65) Prior Publication Data

US 2007/0274666 A1 Nov. 29, 2007

(30) Foreign Application Priority Data

Apr. 14, 2006 (JP) ............... 2006-112013

(51) Int. Cl.
*G02B 6/00* (2006.01)
(52) U.S. Cl. ....................... 385/142; 385/123
(58) Field of Classification Search ......... 385/123–128, 385/141–145
See application file for complete search history.

(56) References Cited

U.S. PATENT DOCUMENTS

| | | | |
|---|---|---|---|
| 4,690,504 A | 9/1987 | Yokokawa et al. | |
| 5,681,365 A | 10/1997 | Gilliland et al. | |
| 6,289,161 B1 | 9/2001 | Schötz et al. | |
| 6,917,740 B2 * | 7/2005 | Boek et al. | ............ 385/123 |
| 2004/0240814 A1 | 12/2004 | Boek et al. | |

FOREIGN PATENT DOCUMENTS

| | | | |
|---|---|---|---|
| EP | 0 164 681 A2 | 12/1985 |
| JP | 58-125635 A | 7/1983 |
| JP | 61 251 539 A | 11/1986 |
| JP | 3-247536 A | 11/1991 |

OTHER PUBLICATIONS

Kakuta et al. "Radiation Resistant Characteristics of Fluorine Doped Silica Core Fiber", Fujikura Giho, No. 86, 1994, pp. 50-54 (with English translation of relevant portion thereof).
E.J. Friebele et al.: "Correlation of Single-Mode Fiber Radiation Response and Fabrication Parameters", Applied Optics, vol. 30, No. 15, May 20, 1991, pp. 1944-1957, XP002444279.

(Continued)

*Primary Examiner*—Kevin S Wood
(74) *Attorney, Agent, or Firm*—Sughrue Mion, PLLC

(57) ABSTRACT

A radiation resistant single-mode optical fiber has a core and a cladding, each made of fluorine-doped silica glass, in which a chlorine concentration of the core is at least 0.01 ppm, a relative refractive index difference of the core based on the refractive index for silica is between −0.30% and −0.10%, a relative refractive index difference of the core based on the refractive index for the cladding is between 0.3% and 0.5%, a cutoff wavelength is 1.27 μm or below, and a bending loss at a wavelength of 1.3 μm and a bending diameter of 20 mm is 0.5 dB/m or less.

7 Claims, 2 Drawing Sheets

OTHER PUBLICATIONS

M. Ogai, et al.: "Development and Performance of Fully Fluorine-Doped Single-Mode Fibers", Journal of Lightwave Technology, IEEE Service Center, New York, NY, US, vol. 6, No. 10, Oct. 1, 1988, pp. 1455-1461, XP000034866, ISSN: 0733-8724, *pp. 1455-1456, Figure 5-.

A.V. Bondarenko et al., "A Study of Radiation Resistance of Silica Optical Fibers Under Conditions of Reactor Irradiation", Instruments and Experimental Techniques, Kluwer Academic Publishers-Plenum Publishers, NE, vol. 49, No. 2, Mar. 1, 2006, pp. 190-198, XP019297234, ISSN: 1608-3180, *p. 192; table*.

* cited by examiner

RADIATION RESISTANT SINGLE-MODE OPTICAL FIBER AND METHOD OF MANUFACTURING THEREOF

CROSS-REFERENCE TO RELATED APPLICATIONS

This application claims priority from Japanese Patent Application No. 2006-112013, filed Apr. 14, 2006, the contents of which are incorporated herein by reference.

BACKGROUND OF THE INVENTION

1. Field of the Invention

The present invention relates to a silica glass optical fiber. More specifically, it relates to a radiation resistant single-mode optical fiber which has a low transmission loss even in an environment where it is exposed to radiation, and which experiences a rapid recovery from transmission loss when placed in a radiation-free environment following exposure to a radiation environment.

2. Related Art

When silica glass optical fibers are used in a radiation environment, a loss in the amount of transmitted light (induced loss) arises due to the radiation environment. Optical absorption in the ultraviolet and visible light regions is known to arise due to dopants such as germanium, which are generally used to control the refractive index, and due to impurities present in the optical fiber manufacturing process. For this reason, the wavelength band used for optical fibers employed in a radiation environment has until now been a wavelength of 0.85 µm.

It has hitherto been known that, in the core, pure silica core fibers which are free of germanium and fluorine-doped silica core optical fibers have excellent radiation resistance. In addition, optical fibers of which cores are doped with hydroxyl groups, germanium or phosphorus to further improve the radiation resistance over that of pure silica core fibers have been reported.

For example, "Radiation Resistance of Fluorine-Doped Silica Core Fibers" (*Fujikura Giho*, No. 86 (1994)) describes the radiation resistance of fluorine-doped silica core optical fibers which are large-diameter optical fibers having a core diameter of 200 µm and a cladding diameter of 250 µm.

Japanese Unexamined Patent Application, First Publication No. S58-125635 discloses a radiation resistant single-mode optical fiber composed of high-purity silica glass to which from 0.1 to several percent of hydroxyl groups have been added. Although it had previously been known that optical fibers with a silica glass core have an excellent radiation resistance, the discovery was made that increases in loss can be suppressed by adding hydroxyl groups.

In addition, Japanese Unexamined Patent Application, First Publication No. H3-247536 describes the results of tests conducted on completely fluorine-doped optical fibers composed of a core and cladding which are both doped with fluorine, wherein the core has a fluorine concentration of up to 0.1 atom % and has also been doped with up to 0.1 mol % of $GeO_2$ or $P_2O_5$.

Of the optical fibers used in radiation environments, there is an increased desire for optical fibers which can be employed at the 1.3 µm and 1.55 µm bands normally used for transmission.

However, the optical fibers manufactured in the above *Fujikura Giho* article were all large-diameter optical fibers having a core diameter of 200 µm and a cladding diameter of 250 µm, and the light source used for evaluating the fibers had a wavelength of 0.85 µm. Hence, no implications are made therein, nor evaluations provided, which serve to indicate what fluorine concentrations and fiber constructions would be desirable for radiation resistant single-mode optical fibers capable of being used at the 1.3 µm and 1.55 µm bands.

In Japanese Unexamined Patent Application, First Publication No. S58-125635, adding hydroxyl groups increases absorption at 1.38 µm, making use difficult in the communication wavelength bands at 1.3 µm and 1.55 µm. Although the wavelength at which transmission loss was evaluated in Japanese Unexamined Patent Application, First Publication No. S58-125635 is not specifically mentioned, the 0.85 µm wavelength appears to have been used.

In Japanese Unexamined Patent Application, First Publication No. H3-247536, the fluorine concentration in the core of the completely fluorine-doped optical fiber is 0.1 atom % or less, which is very low, and the relative refractive index difference with respect to pure silica glass ($\Delta-$) is 0.03% or less. A fluorine-doped glass having a relative refractive index difference with pure silica glass ($\Delta-$) of about 0.07% is also mentioned, but nothing is indicated concerning its radiation resistance. Hence, at fluorine concentrations of the level indicated here, the radiation-induced loss deterioration-suppressing effects are very small.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

In an exemplary embodiment of the present invention, radiation resistant single-mode optical fibers can be used at the 1.3 µm and 1.55 µm bands normally employed for transmission, which undergo little bending loss and transmission loss even in an environment where they are not exposed to radiation, and which moreover are radiation resistant and cost-effective. An exemplary embodiment of the present invention can also provide a process for manufacturing such optical fibers.

The inventors have created optical fibers by preparing a fluorine-doped silica glass from a pure silica core soot to which fluorine was added, then applying thereto a cladding capable of achieving the refractive index profile necessary for transmission at the 1.3 µm band, and have carried out various tests on the optical fibers. In doing so, the inventors have fabricated the optical fibers while varying the amount of fluorine added to the core and the cladding, and also variously modifying the optical fiber drawing conditions, and have evaluated the properties of the resulting optical fibers, both before exposure to a radiation environment and after exposure to such radiation.

As a result, the inventors have discovered that optical fibers of the following construction have a low bending loss and a low transmission loss even in an environment where they are not exposed to radiation, and moreover have a good radiation resistance and a good cost effectiveness.

Accordingly, in a first aspect, a radiation resistant single-mode optical fiber is provided having a core and a cladding, each made of fluorine-doped silica glass, in which a chlorine concentration of the core is at least 0.01 ppm, a relative refractive index difference of the core based on the refractive index for silica is between −0.30% and −0.10%, a relative refractive index difference of the core based on the refractive index for the cladding is between 0.3% and 0.5%, a cutoff wavelength is 1.27 μm or below, and a bending loss at a wavelength of 1.3 μm and a bending diameter of 20 mm is 0.5 dB/m or less.

Here, the cutoff wavelength refers to the value obtained by the method for measuring the optical fiber cable cutoff wavelength (optical fiber cable length, 22 m) described in the International Telecommunication Union-Telecommunication Standardization Sector (ITU-T) Recommendation G.650.

In a second aspect, a radiation resistant single-mode optical fiber is provided according to the above first aspect, in which a fluorine concentration of the core is between 0.6 wt % and 1.0 wt %.

In a third aspect, a radiation resistant single-mode optical fiber is provided according to the above first aspect and the above second aspect, in which, when $r_1$ is the core radius and $r_2$ is the cladding radius, a cladding to core diameter ratio $r_2/r_1$ is between 12 and 17, a transmission loss at a wavelength of 1.3 μm is 1.0 dB/km or less, and a mode field diameter (MFD) at a wavelength of 1.3 μm is not less than 8.0 μm.

In a fourth aspect, a radiation resistant single-mode optical fiber is provided according to the above first aspect to the above third aspect, in which, when irradiated for 60 minutes at an exposure dose rate of $1.0 \times 10^6$ R/h, a transmission loss increase is 10.0 dB/km or less at a wavelength of 1.3 μm.

In a fifth aspect, a method of manufacturing the radiation resistant single-mode optical fiber is provided according to the above first aspect to the above fourth aspect, the method being comprised of drawing an optical fiber preform having a core and a cladding, each made of fluorine-doped silica glass, at a fiber drawing tension between 0.10 N and 0.40 N and a fiber drawing speed between 10 m/min and 100 m/min, in which a chlorine concentration of the core of the optical fiber preform is at least 0.01 ppm, a relative refractive index difference of the core of the optical fiber preform based on the refractive index for silica is between −0.30% and −0.10%, and a relative refractive index difference of the core of the optical fiber preform based on the refractive index for the cladding of the optical fiber preform is between 0.3% and 0.5%.

Because exemplary embodiments of the present invention relate to a radiation resistant single-mode optical fiber composed of a core and a cladding, each made of fluorine-doped silica glass, which optical fiber is characterized in that a chlorine concentration of the core is at least 0.01 ppm, a relative refractive index difference of the core based on the refractive index for silica is between −0.30% and −0.10%, a relative refractive index difference of the core based on the refractive index for the cladding is between 0.3% and 0.5%, a cutoff wavelength is 1.27 μm or below, and a bending loss at a wavelength of 1.3 μm and a bending diameter of 20 mm is 0.5 dB/m or less, the radiation resistant single-mode optical fiber has a low initial loss and experiences minimal loss following exposure to a radiation environment.

Such a radiation resistant single-mode optical fiber can be obtained by drawing an optical fiber preform having a core and a cladding, each made of fluorine-doped silica glass, at a fiber drawing tension between 0.10 N and 0.40 N and a fiber drawing speed between 10 m/min and 100 m/min, in which a chlorine concentration of the core of the optical fiber preform is at least 0.01 ppm, a relative refractive index difference of the core of the optical fiber preform based on the refractive index for silica is between −0.30% and −0.10%, and a relative refractive index difference of the core of the optical fiber preform based on the refractive index for the cladding of the optical fiber preform is between 0.3% and 0.5%.

BRIEF DESCRIPTION OF THE DRAWINGS

The above and other aspects of the present invention will become more apparent from the following detailed description of exemplary embodiments with the accompanying drawings, in which.

DETAILED DESCRIPTION OF EXEMPLARY EMBODIMENTS OF THE INVENTION

Figure 1:
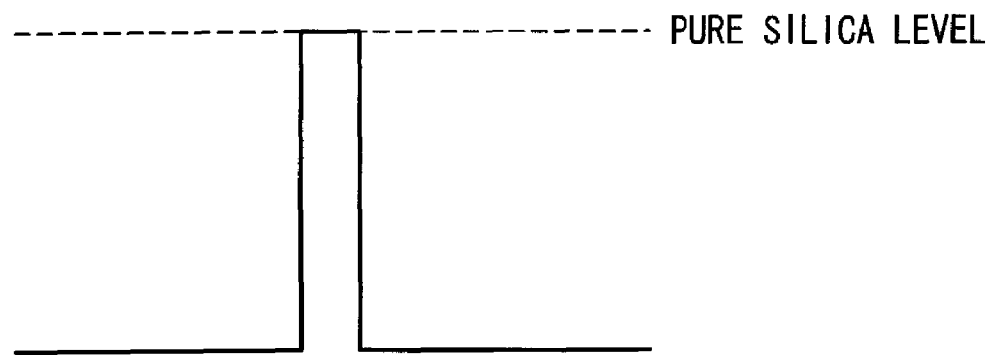
FIG. 1 shows the refractive index profile for optical fiber No. 1 obtained in Comparative Example 1.

In the radiation resistant single-mode optical fiber of exemplary embodiments of the invention, both the core and the cladding are made of silica glass doped with fluorine, and the core has a relative refractive index difference based on the refractive index for silica between −0.30% and −0.10%. If the core has a fluorine concentration of less than 0.4 wt % and a relative refractive index difference based on the refractive index for silica that is above −0.10%, the transmission loss-suppressing effect in an environment where the optical fiber is exposed to a radiation environment will be inadequate. On the other hand, if the core has a fluorine concentration of more than 1.2 wt % and a relative refractive index difference based on the refractive index for silica that is below −0.30%, fluorine doping will give rise to an induced loss when the optical fiber is not exposed to a radiation environment, in addition to which the transmission loss properties at a low radiation exposure dose will also be poor.

In the radiation resistant single-mode optical fiber of exemplary embodiments of the invention, it is necessary for the core to have a chlorine concentration of at least 0.01 ppm. If dehydration treatment with chlorine has not been carried out, the absorption loss at 1.38 μm will be large, making use of the 1.3 μm wavelength band difficult.

In the radiation resistant single-mode optical fiber of exemplary embodiments of the invention, the core has a relative refractive index difference based on the refractive index for the cladding between 0.3% and 0.5%. At a relative refractive index difference below 0.3%, it is difficult to lower the bending loss while satisfying the cutoff wavelength for use in the 1.3 μm wavelength band. On the other hand, at a relative refractive index difference above 0.5%, fluorine doping of the cladding has an effect which gives rise to an induced loss when the optical fiber is not exposed to radiation, in addition to which the transmission loss properties at a low radiation exposure dose are poor.

In the radiation resistant single-mode optical fiber of exemplary embodiments of the invention, to achieve a desirable relative refractive index difference, it is preferable for the core to have a fluorine concentration between 0.4 wt % and 1.2 wt %. A core fluorine concentration between 0.6 wt % and 1.0 wt % is more preferred for minimizing the induced loss when the optical fiber is not exposed to radiation, and for achieving a sufficient transmission loss-suppressing effect in an environment where the optical fiber is exposed to radiation.

In the radiation resistant single-mode optical fiber of exemplary embodiments of the invention, it is preferable for the cladding to core diameter ratio ($r_2/r_1$) to be between 12 and 17, for the transmission loss at a wavelength of 1.3 μm to be 1.0 dB/km or less, and for the mode field diameter (MFD) at a wavelength of 1.3 μm to be at least 8 μm.

At a cladding to core diameter ratio $r_2/r_1$ below 12, the bending loss increases, whereas at a cladding to core diameter ratio $r_2/r_1$ above 17, the cutoff wavelength increases, making the optical fiber unsuitable for use in the 1.3 μm wavelength band. Also, when the transmission loss at a wavelength of 1.3 μm exceeds 1.0 dB/km, the loss level at a low radiation dose or in the absence of radiation is high, giving rise to a deterioration in the properties. The transmission loss at a wavelength of 1.3 μm is more preferably 0.5 dB/km or less. Moreover, it is desirable for the mode field diameter (MFD) at a wavelength of 1.3 μm to be at least 8 μm. At less than 8 μm, the connection loss when the optical fiber is connected with a common telecommunications fiber will deteriorate. It is desirable for the upper limit in the mode fiber diameter (MFD) at a wavelength of 1.3 μm to be about 10 μm.

Exemplary embodiments of the present invention are able to provide a radiation resistant single-mode optical fiber having an induced loss of not more than 10.0 dB/km when exposed to a radiation environment for 60 minutes at an exposure dose rate of $1.0\times10^6$ R/h. The induced loss under the same conditions is more preferably not more than 8.0 dB/km.

Induced loss from exposure to a radiation environment is caused in part by defects which are generated in the optical fiber manufacturing process. Such defects may act as precursors, leading to major loss deterioration during exposure to a radiation environment.

The ease with which such defects are generated differs according to the optical fiber drawing conditions. A lower fiber drawing tension and a lower fiber drawing speed result in the generation of fewer defects, although productivity suffers.

If the fiber drawing tension is too low, control during fiber drawing becomes unstable. If the fiber drawing speed is too slow, the production output per unit hour decreases, which is not economically desirable.

In exemplary embodiments of the inventive method for manufacturing radiation resistant single-mode optical fibers, drawing is carried out at a fiber drawing tension between 0.10 N and 0.40 N and a fiber drawing speed between 10 m/min and 100 m/min.

EXAMPLES

Comparative Example 1

Silica soot was produced by vapor phase axial deposition (VAD). The silica soot was dehydrated in a 1000° C. atmosphere of helium gas (4 liters) and chlorine gas (160 cc), then sintered in a 1450° C. atmosphere of helium gas (4 liters). The resulting glass was then drawn and silica glass was applied to the outside vapor deposition.

This was followed by dehydration in a 1000° C. atmosphere of helium gas (4 liters) and chlorine gas (160 cc), and sintering in a 1350° C. atmosphere composed of helium gas (4 liters) and $SiF_4$ gas (220 cc). The outside vapor deposition of silica glass was again carried out, yielding an optical fiber preform having a cladding to core diameter ratio ($r_2/r_1$) of 14 and a core relative refractive index difference based on the refractive index for the cladding of 0.35%.

This optical fiber preform was drawn at a fiber drawing tension of 0.40 N and a fiber drawing speed of 100 m/min, then coated to a diameter of 250 μm with a UV-curable resin. FIG. 1 shows the refractive index profile for the resulting optical fiber (No. 1). The properties of this optical fiber (No. 1) are presented in Table 1.

TABLE 1

|  |  | Units | No. 1 | No. 2 | No. 3 | No. 4 | No. 5 | No. 6 | No. 7 |
|---|---|---|---|---|---|---|---|---|---|
| Core | Relative refractive index difference for pure $SiO_2$ | % | 0.00 | −0.05 | −0.05 | −0.10 | −0.10 | −0.20 | −0.20 |
|  | Fluorine concentration | wt % | 0.0 | 0.2 | 0.2 | 0.4 | 0.4 | 0.8 | 0.8 |
|  | Chlorine concentration | ppm | 0.03 | 0.03 | 0.03 | 0.05 | 0.05 | 0.05 | 0.05 |
| Cladding | Relative refractive index difference for pure $SiO_2$ | % | −0.35 | −0.40 | −0.40 | −0.45 | −0.45 | −0.55 | −0.55 |
|  | Fluorine concentration | wt % | 1.6 | 1.6 | 1.6 | 1.8 | 1.8 | 2.2 | 2.2 |
| Fiber drawing tension |  | N | 0.40 | 0.25 | 0.31 | 0.25 | 0.31 | 0.25 | 0.31 |
| Fiber drawing speed |  | m/min | 100 | 60 | 100 | 60 | 100 | 60 | 100 |
| Transmission loss (1310 nm) |  | dB/km | 0.38 | 0.36 | 0.37 | 0.38 | 0.39 | 0.43 | 0.44 |
| Bending loss (bending diameter, 20 mm; wavelength, 1310 nm) |  | dB/m | 0.01 | <0.01 | <0.01 | <0.01 | <0.01 | <0.01 | <0.01 |
| Cable cutoff wavelength |  | μm | 1.25 | 1.22 | 1.20 | 1.21 | 1.21 | 1.21 | 1.19 |
| Mode field diameter (MFD) at 1.3 μm |  | μm | 8.7 | 8.6 | 8.6 | 8.6 | 8.6 | 8.5 | 8.5 |
| Induced loss (1310 nm) following exposure to radiation* |  | dB/km | 24.0 | 11.0 | 15.0 | 7.0 | 10.0 | 5.0 | 8.0 |

*Irradiation for 60 minutes at an exposure dose rate of $1.0 \times 10^6$ R/h.

Figure 2:
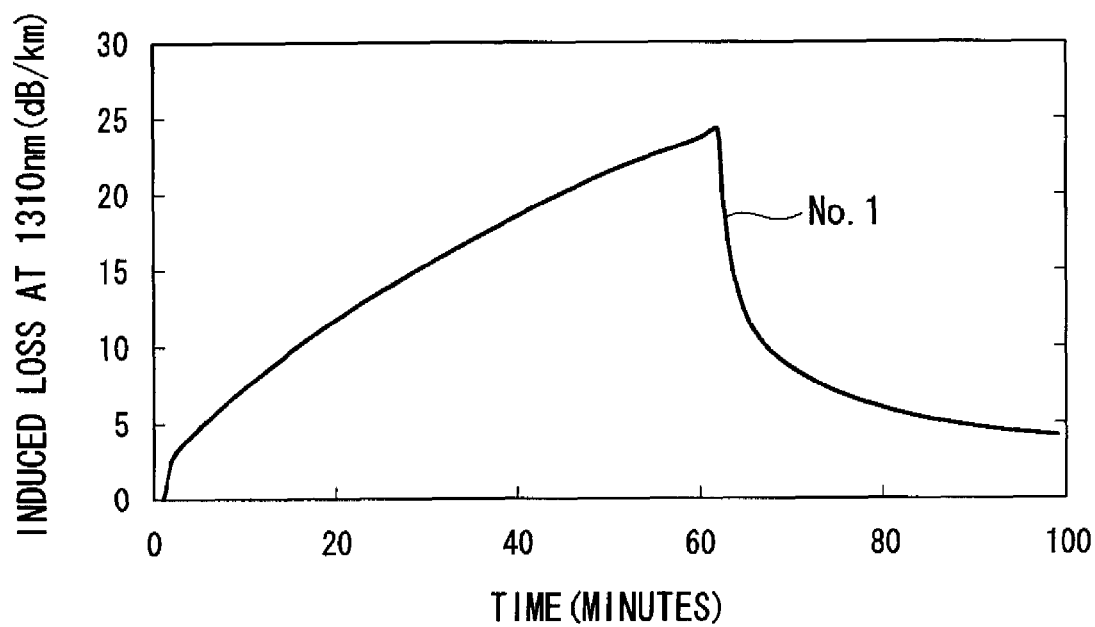
FIG. 2 is a graph of the induced loss during and after exposure to a radiation environment for optical fiber No. 1 obtained in Comparative Example 1.

Test results for transmission loss due to exposure of this optical fiber to a radiation environment are shown in FIG. 2. The optical fiber was exposed to a radiation environment for 60 minutes at an exposure dose rate of $1.0 \times 10^6$ R/h, and the induced loss during and after exposure was measured at a wavelength of 1.3 μm.

The induced loss was 24.0 dB/km, indicating that the induced loss due to exposure to the radiation environment was large.

Comparative Example 2 and Example 1

In each example, a silica soot was produced by a VAD method. The silica soot was dehydrated in a 1000° C. atmosphere of helium gas (4 liters) and chlorine gas (160 cc), then sintered in a 1450° C. atmosphere of helium gas (4 liters) to which $SiF_4$ gas was added so as to achieve the desired amount of fluorine addition. The resulting glass was drawn, and fluorine doped silica glass was applied to the outside vapor deposition.

This was followed by dehydration in a 1000° C. atmosphere of helium gas (4 liters) and chlorine gas (160 cc), and sintering in a 1450° C. atmosphere of helium gas (4 liters) to which $SiF_4$ was added in a fluorine concentration for providing a given relative refractive index difference. The outside vapor deposition of fluorine doped silica glass was again carried out, yielding an optical fiber preform having a cladding to core diameter ratio ($r_2/r_1$) of 14 and a core relative refractive index difference based on the refractive index for the cladding of 0.35%.

Figure 3:
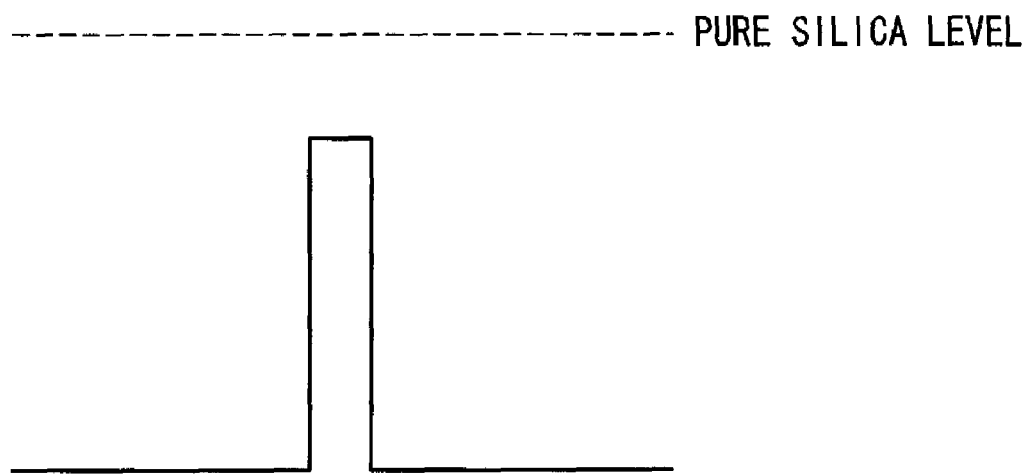
FIG. 3 shows the refractive index profile for the optical fiber obtained in an exemplary embodiment of the invention.

These optical fiber preforms were drawn at a fiber drawing tension between 0.20 N and 0.40 N and a fiber drawing speed between 60 m/min and 100 m/min, then coated to a diameter of 250 μm with a UV-curable resin. FIG. 3 shows the refractive index profile for the resulting optical fibers. The properties of these optical fibers (Nos. 2 to 7) are presented in Table 1.

Figure 4:
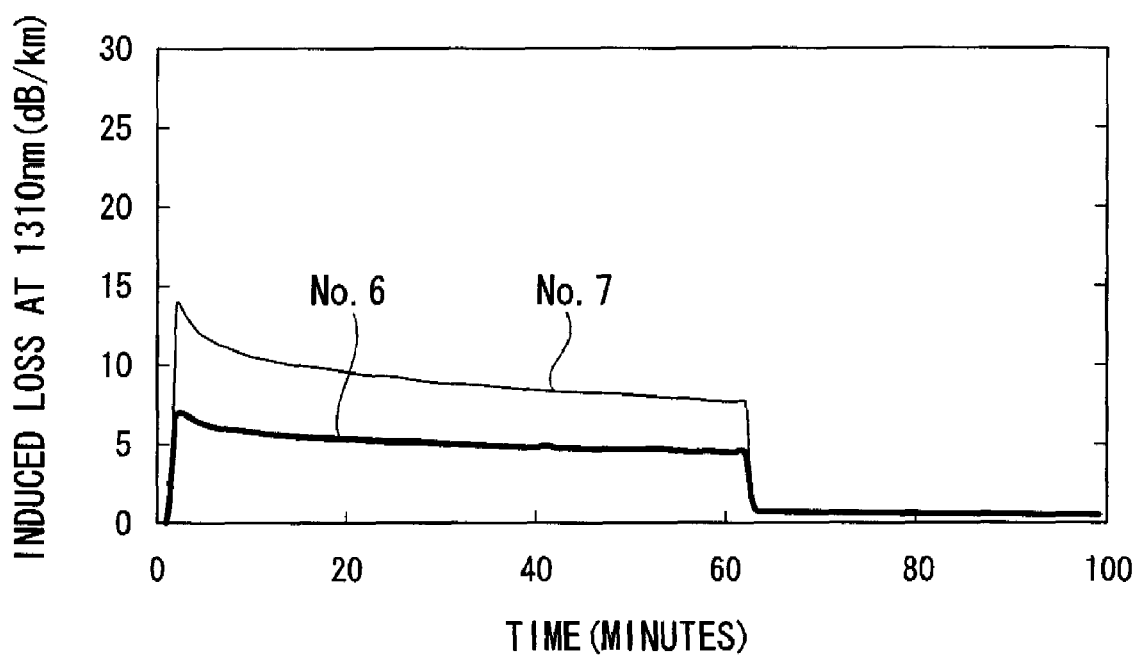
FIG. 4 is a graph of the induced loss during and after exposure to radiation environment for optical fibers (Nos. 6 and 7) obtained in an exemplary embodiment of the invention.

The optical fibers obtained in Comparative Example 2 (optical fibers Nos. 2 and 3) and in Example 1 according to the invention (optical fibers Nos. 4 to 7) were exposed to a radiation environment for 60 minutes at an exposure dose rate of $1.0 \times 10^6$ R/h, and the induced loss during and after exposure was measured at a wavelength of 1.3 μm. The induced loss at a wavelength of 1.3 μm after 60 minutes of exposure was 11.0 dB/km for optical fiber No. 2, 15.0 dB/km for optical fiber No. 3, 7.0 dB/km for optical fiber No. 4, 8.0 dB/km for optical fiber No. 5, 5.0 dB/km for optical fiber No. 6, and 8.0 dB/km for optical fiber No. 7. At a higher amount of fluorine addition, it was possible to suppress the induced loss due to the radiation environment. Moreover, even at a low fiber drawing tension and a low fiber drawing speed, it was possible to suppress the induced loss due to the radiation environment. FIG. 4 shows the induced loss during and after exposure of optical fibers Nos. 6 and 7 to the radiation environment.

Example 2

Silica soot was produced by a VAD method. The silica soot was dehydrated in a 1000° C. atmosphere of helium gas (4 liters) and chlorine gas (160 cc), following which fluorine was added in an atmosphere of helium gas (4 liters) and fluorine (10 cc), and the silica soot was sintered in a 1450° C. atmosphere. The resulting glass was then drawn and silica glass was applied to the outside vapor deposition so as to obtain a given cladding to core diameter ratio.

This was followed by dehydration in a 1000° C. atmosphere of helium gas (4 liters) and chlorine gas (160 cc), following which fluorine was added in an atmosphere of helium gas (4 liters) and fluorine (2.7 liters), and the silica soot was sintered at 1350° C. The outside vapor deposition method of fluorine doped silica glass was again carried out, yielding an optical fiber preform having a cladding to core diameter ratio ($r_2/r_1$) of 14 and a core relative refractive index difference based on the refractive index for the cladding of 0.35%.

This optical fiber preform was drawn (spun) at a fiber drawing tension between 0.10 N and 0.60 N and a fiber drawing speed between 10 m/min and 120 m/min, then coated to a diameter of 250 μm with a UV-curable resin. The properties of these optical fibers (Nos. 8 to 17) are presented in Tables 2 and 3.

TABLE 2

| | | Units | No. 8 | No. 9 (No. 6) | No. 10 | No. 11 | No. 12 |
|---|---|---|---|---|---|---|---|
| Core | Relative refractive index difference for pure $SiO_2$ | % | −0.20 | −0.20 | −0.20 | −0.20 | −0.20 |
| | Fluorine concentration | wt % | 0.8 | 0.8 | 0.8 | 0.8 | 0.8 |
| | Chlorine concentration | ppm | 0.05 | 0.05 | 0.05 | 0.05 | 0.05 |
| Cladding | Relative refractive index difference for pure $SiO_2$ | % | −0.55 | −0.55 | −0.55 | −0.55 | −0.55 |
| | Fluorine concentration | wt % | 2.2 | 2.2 | 2.2 | 2.2 | 2.2 |
| Fiber drawing tension | | N | 0.10 | 0.25 | 0.31 | 0.40 | 0.60 |
| Fiber drawing speed | | m/min | 60 | 60 | 60 | 60 | 60 |
| Transmission loss (1310 nm) | | dB/km | 0.41 | 0.43 | 0.44 | 0.46 | 0.60 |
| Bending loss (bending diameter, 20 mm; wavelength, 1310 nm) | | dB/m | <0.01 | <0.01 | <0.01 | <0.01 | <0.01 |
| Cable cutoff wavelength | | μm | 1.21 | 1.21 | 1.22 | 1.23 | 1.27 |
| Mode field diameter (MFD) at 1.3 μm | | μm | 8.5 | 8.5 | 8.6 | 8.7 | 9.0 |
| Induced loss (1310 nm) following exposure to radiation* | | dB/km | 4.0 | 5.0 | 6.0 | 8.0 | 11.0 |

*Irradiation for 60 minutes at an exposure dose rate of $1.0 \times 10^6$ R/h.

TABLE 3

| | | Units | No. 13 | No. 14 | No. 15 (No. 6) | No. 16 | No. 17 | No. 18 | No. 19 |
|---|---|---|---|---|---|---|---|---|---|
| Core | Relative refractive index difference for pure $SiO_2$ | % | −0.20 | −0.20 | −0.20 | −0.20 | −0.20 | −0.30 | −0.35 |
| | Fluorine concentration | wt % | 0.8 | 0.8 | 0.8 | 0.8 | 0.8 | 1.2 | 1.4 |
| | Chlorine concentration | ppm | 0.05 | 0.05 | 0.05 | 0.05 | 0.05 | 0.05 | 0.05 |
| Cladding | Relative refractive index difference for pure $SiO_2$ | % | −0.55 | −0.55 | −0.55 | −0.55 | −0.55 | −0.65 | −0.70 |
| | Fluorine concentration | wt % | 2.2 | 2.2 | 2.2 | 2.2 | 2.2 | 2.6 | 2.8 |
| Fiber drawing tension | | N | 0.25 | 0.25 | 0.25 | 0.25 | 0.25 | 0.25 | 0.25 |
| Fiber drawing speed | | m/min | 10 | 30 | 60 | 100 | 120 | 100 | 100 |
| Transmission loss (1310 nm) | | dB/km | 0.42 | 0.43 | 0.43 | 0.43 | 0.44 | 0.80 | 2.50 |
| Bending loss (bending diameter, 20 mm; wavelength, 1310 nm) | | dB/m | <0.01 | <0.01 | <0.01 | <0.01 | <0.01 | <0.01 | <0.01 |
| Cable cutoff wavelength | | μm | 1.21 | 1.21 | 1.21 | 1.21 | 1.21 | 1.22 | 1.22 |
| Mode field diameter (MFD) at 1.3 μm | | μm | 8.5 | 8.5 | 8.5 | 8.5 | 8.5 | 8.6 | 8.6 |
| Induced loss (1310 nm) following exposure to radiation* | | dB/km | 5.0 | 5.0 | 6.0 | 7.0 | 11.0 | 4.0 | 3.0 |

*Irradiation for 60 minutes at an exposure dose rate of $1.0 \times 10^6$ R/h.

As shown in Table 2, a higher fiber drawing tension leads to a higher transmission loss (e.g., at a fiber drawing tension of 0.60 N, the transmission loss was 0.60 dB/km), resulting in a high loss. A low loss at times other than during exposure to a radiation environment is important for maintaining the transmission properties during normal use. To this end, it is desirable for the fiber drawing tension to be 0.40 N or less. Moreover, at a low fiber drawing tension, the induced loss during exposure to a radiation environment is also limited. It is thus preferable for the fiber drawing tension to be 0.40 N or below. In actual production, at below 0.10 N, control of the drawing condition during fiber drawing is difficult.

As shown in Table 3, at a higher fiber drawing speed, the deterioration in loss during exposure to radiation increases. This is because fewer defects that can cause a deterioration in loss are generated at a low fiber drawing tension.

Example 3

A silica soot was produced by a VAD method. This silica soot was dehydrated in a 1000° C. atmosphere of (4 liters) and chlorine gas (160 cc), then sintered in a 1300° C. atmosphere of helium gas (4 liters) to which 180 cc of $SiF_4$ gas was added. The resulting glass was drawn, and the fluorine doped silica glass was applied to the outside vapor deposition.

This was followed by dehydration in a 1000° C. atmosphere of helium gas (4 liters) and chlorine gas (160 cc), and sintered in an atmosphere of helium gas (1 liter) and $SiF_4$ gas (4 liters). Next, the outside vapor deposition method of silica glass was again carried out, yielding an optical fiber preform having a cladding to core diameter ratio ($r_2/r_1$) of 14 and a core relative refractive index difference based on the refractive index for the cladding of 0.35%.

The optical fiber preform was drawn (spun) at a fiber drawing tension of 0.25 N and a fiber drawing speed of 100 m/min, then coated to a diameter of 250 μm with a UV-curable resin. The properties of the resulting optical fiber (No. 18) are presented in Table 3.

This optical fiber (No. 18) was exposed to a radiation environment for 60 minutes at an exposure dose rate of $1.0 \times 10^6$ R/h, and the transmission loss during and after exposure was measured at a wavelength of 1.3 μm. The induced loss at a wavelength of 1.3 μm following 60 minutes of exposure was 4.0 dB/km. At a higher amount of fluorine addition, it was possible to suppress the induced loss due to radiation environment. The initial loss was 0.8 dB/km.

Comparative Example 3

A silica soot was produced by a VAD method. This silica soot was dehydrated in a 1000° C. atmosphere of helium (4 liters) and chlorine gas (160 cc), then vitrified in a 1300° C. atmosphere of helium gas (4 liters) to which 220 cc of $SiF_4$ gas had been added. The resulting glass was drawn, and the fluorine doped silica glass was applied to the outside vapor deposition method.

This was followed by dehydration in a 1000° C. atmosphere of helium gas (4 liters) and chlorine gas (160 cc), and sintering in an atmosphere of $SiF_4$ gas alone. Next, the outside vapor deposition method of the fluorine doped silica glass was again carried out, yielding an optical fiber preform having a cladding to core diameter ratio ($r_2/r_1$) of 14 and a core relative refractive index difference based on the refractive index for the cladding of 0.35%.

The optical fiber preform was drawn at a fiber drawing tension of 0.25 N and a fiber drawing speed of 100 m/min, then coated to a diameter of 250 μm with a UV-curable resin. The properties of the optical fiber (No. 19) are presented in Table 3.

This optical fiber (No. 19) was exposed to a radiation environment for 60 minutes at an exposure dose rate of $1.0 \times 10^6$ R/h, and the induced loss during and after irradiation was measured at a wavelength of 1.3 μm. The induced loss at a wavelength of 1.3 μm following 60 minutes of exposure was 3.0 dB/km. At a higher amount of fluorine addition, it was possible to suppress the induced loss due to the radiation environment. The initial loss of 2.5 dB/km was high, making the optical fiber unsuitable for data communications.

The silica glass optical fibers described herein can be employed as radiation resistant single-mode optical fibers having a low transmission loss even in an environment where they are exposed to radiation environment and which experience a rapid recovery from transmission loss when placed in a radiation-free environment following exposure to radiation environment.

While the present invention has been particularly shown and described with reference to exemplary embodiments thereof, it will be understood by those of ordinary skill in the art that various changes in form and details may be made therein without departing from the spirit and scope of the present invention as defined by the following claims and their legal equivalents.

What is claimed is:

1. A radiation resistant single-mode optical fiber comprising a core and a cladding, wherein:
    the core and the cladding comprise fluorine-doped silica glass,
    a chlorine concentration of the core is between 0.01 ppm and 0.05 ppm,
    a flourine concentration of the core between 0.8 wt % and 1.2 wt %,
    a relative refractive index difference of the core based on a refractive index for the cladding is between 0.3% and 0.5%, a cutoff wavelength is not greater than 1.27 μm, and
    a bending loss at a wavelength of 1.3 μm and a bending diameter of 20 mm is not greater than 0.5 dB/m.

2. The radiation resistant single-mode optical fiber according to claim 1, wherein $r_1$ is a core radius and $r_2$ is a cladding radius, a cladding to core diameter ratio $r_2/r_1$ is between 12 and 17, a transmission loss at a wavelength of 1.3 μm is not greater than 1.0 dB/km, and a mode field diameter (MFD) at a wavelength of 1.3 μm is not less than 8.0 μm.

3. The radiation resistant single-mode optical fiber according to claim 2, wherein if the optical fiber is irradiated for 60 minutes at an exposure dose rate of $1.0 \times 10^6$ R/h, a transmission loss increase is not greater than 10.0 dB/km at a wavelength of 1.3 μm.

4. A method of manufacturing the radiation resistant single-mode optical fiber according to claim 2, the method comprising drawing an optical fiber preform comprising a core and a cladding at a fiber drawing tension between 0.10 N and 0.40 N and a fiber drawing speed between 10 m/min and 100 m/min, wherein:
    the core and the cladding of the optical fiber preform comprise fluorine-doped silica glass,
    a chlorine concentration of the core of the optical fiber preform is between 0.01 ppm and 0.05 ppm,
    a flourine concentration of core is between 0.8 wt % and 1.2 wt %, and
    a relative refractive index difference of the core of the optical fiber preform based on a refractive index of the cladding of the optical fiber preform is between 0.3% and 0.5%.

5. The radiation resistant single-mode optical fiber according to claim 1, wherein, if the optical fiber is irradiated for 60 minutes at an exposure dose rate of $1.0 \times 10^6$ R/h, a transmission loss increase is not greater than 10.0 dB/km at a wavelength of 1.3 μm.

6. A method of manufacturing the radiation resistant single-mode optical fiber according to claim 5, the method comprising drawing an optical fiber preform comprising a core and a cladding at a fiber drawing tension between 0.10 N and 0.40 N and a fiber drawing speed between 10 m/min and 100 m/min, wherein:
    the core and the cladding of the optical fiber preform comprise fluorine-doped silica glass,
    a chlorine concentration of the core of the optical fiber preform is between 0.01 ppm and 0.05 ppm,
    a flourine concentration of core is between 0.8 wt % and 1.2 wt %, and
    a relative refractive index difference of the core of the optical fiber preform based on a refractive index of the cladding of the optical fiber preform is between 0.3% and 0.5%.

7. A method of manufacturing the radiation resistant single-mode optical fiber according to claim 1, the method comprising drawing an optical fiber preform comprising a core and a cladding at a fiber drawing tension between 0.10 N and 0.40 N and a fiber drawing speed between 10 m/min and 100 m/min, wherein:
    the core and the cladding of the optical fiber preform comprise fluorine-doped silica glass,
    a chlorine concentration of the core of the optical fiber preform is between 0.01 ppm and 0.05 ppm,
    a flourine concentration of core is between 0.8 wt % and 1.2 wt %, and
    a relative refractive index difference of the core of the optical fiber preform based on a refractive index of the cladding of the optical fiber preform is between 0.3% and 0.5%.

* * * * *